(12) United States Patent
Ukita et al.

(10) Patent No.: US 9,704,511 B2
(45) Date of Patent: Jul. 11, 2017

(54) PERPENDICULAR MAGNETIC RECORDING HEAD WITH IMPROVED DENSITY RECORDING

(71) Applicant: TDK CORPORATION, Tokyo (JP)

(72) Inventors: Hideyuki Ukita, Tokyo (JP); Kenkichi Anagawa, Tokyo (JP); Kei Hirata, Tokyo (JP); Atsushi Yamaguchi, Tokyo (JP); Ittetsu Kitajima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 268 days.

(21) Appl. No.: 14/539,081

(22) Filed: Nov. 12, 2014

(65) Prior Publication Data

US 2016/0133276 A1    May 12, 2016

(51) Int. Cl.
*G11B 5/127*      (2006.01)
*G11B 5/31*       (2006.01)

(52) U.S. Cl.
CPC .......... *G11B 5/1278* (2013.01); *G11B 5/1276* (2013.01); *G11B 5/315* (2013.01); *G11B 5/3116* (2013.01); *G11B 5/3143* (2013.01)

(58) Field of Classification Search
CPC ... G11B 5/1274; G11B 5/1276; G11B 5/1278; G11B 5/3143; G11B 5/315
USPC .............. 360/125.03, 125.06, 125.08, 125.3
See application file for complete search history.

(56) References Cited

U.S. PATENT DOCUMENTS

| | | | |
|---|---|---|---|
| 5,302,469 A | 4/1994 | Sugenoya et al. | |
| 6,072,671 A | 6/2000 | Gill | |
| 6,151,193 A | 11/2000 | Terunuma et al. | |
| 6,791,793 B1 * | 9/2004 | Chen | G11B 5/1278 360/125.06 |
| 6,828,046 B2 | 12/2004 | Ikeda et al. | |
| 7,646,564 B2 * | 1/2010 | Maruyama | G11B 5/1278 360/125.04 |
| 7,688,545 B1 * | 3/2010 | Vas'Ko | G11B 5/3153 360/125.42 |
| 8,077,434 B1 * | 12/2011 | Shen | G11B 5/1278 360/125.08 |
| 8,259,410 B1 * | 9/2012 | Bai | G11B 5/3136 29/603.07 |
| 8,284,516 B1 * | 10/2012 | Tang | G11B 5/1278 360/125.03 |
| 8,804,282 B1 * | 8/2014 | Sugiyama | G11B 5/1278 360/125.12 |
| 9,053,715 B1 * | 6/2015 | Wang | G11B 5/3116 |
| 9,245,562 B1 * | 1/2016 | Liu | G11B 5/1278 |
| 2003/0021064 A1 * | 1/2003 | Ohtomo | B82Y 10/00 360/125.62 |
| 2005/0286170 A1 | 12/2005 | Hirata et al. | |

(Continued)

FOREIGN PATENT DOCUMENTS

| | | |
|---|---|---|
| JP | A-10-334409 | 12/1998 |
| JP | A-2006-228315 | 8/2006 |

*Primary Examiner* — Jefferson Evans

(74) *Attorney, Agent, or Firm* — Oliff PLC

(57) ABSTRACT

The perpendicular magnetic recording head includes a magnetic pole including a first region and a second region, the first region having a first specific resistance and an end surface exposed on an air bearing surface, the second region having a second specific resistance higher than the first specific resistance and being located at a position recessed from the air bearing surface.

19 Claims, 13 Drawing Sheets

(56) References Cited

U.S. PATENT DOCUMENTS

2008/0278852 A1* 11/2008 Kim .................. G11B 5/1278
360/119.02
2009/0017198 A1 1/2009 Sasaki et al.

* cited by examiner

PERPENDICULAR MAGNETIC RECORDING HEAD WITH IMPROVED DENSITY RECORDING

BACKGROUND OF THE INVENTION

1. Field of the Invention

The invention relates to a perpendicular magnetic recording head.

2. Description of Related Art

In recent years, along with an increased surface recording density in a magnetic recording medium (hereinafter, referred to as a "recording medium") represented by a hard disk, a perpendicular magnetic recording system in which a direction of a signal magnetic field is set to a direction intersecting with a surface of the recording medium is a main stream as a recording system of a magnetic recording head. This is because a line recording density thereof is advantageously higher than that in a longitudinal magnetic recording system in related art, and a recorded recording medium is advantageously less affected by thermal fluctuation. A magnetic recording head of the perpendicular magnetic recording system (hereinafter, referred to as a "perpendicular magnetic recording head") has a main magnetic pole that guides a magnetic flux generated in a thin film coil to a recording medium, and the main magnetic pole has a tip section (a magnetic pole) that emits a magnetic flux to generate a recording magnetic field (a perpendicular magnetic field) and has a narrow width.

In these days, demand to further improve the surface recording density of the magnetic recording medium shows tendency to further increase. In addition, reduction in eddy-current loss in a high frequency region and improvement in response characteristics in the high frequency region are also demanded. Under such a circumstance, it is desirable to provide a perpendicular magnetic recording head and a magnetic recording unit that address higher density recording and are excellent in response characteristics in the high frequency region.

SUMMARY OF THE INVENTION

A perpendicular magnetic recording head according to an embodiment of the invention includes a magnetic pole including a first region and a second region, the first region having a first specific resistance and an end surface exposed on an air bearing surface, the second region having a second specific resistance higher than the first specific resistance and being located at a position recessed from the air bearing surface.

In the perpendicular magnetic recording head as the embodiment of the invention, the magnetic pole has the second region that has the second specific resistance higher than the first specific resistance of the first region having the end surface exposed on the air bearing surface, at the position recessed from the air bearing surface. Therefore, the magnetic pole exhibits high magnetic permeability even in the high frequency region exceeding, for example, 1 GHz, which makes it possible to suppress lowering of the response speed due to eddy loss. Consequently, according to the perpendicular magnetic recording head as the embodiment of the invention, it is possible to achieve excellent response characteristics in the high frequency region while addressing higher density recording.

DETAILED DESCRIPTION OF THE PREFERRED EMBODIMENTS

Hereinafter, an embodiment of the invention will be described in detail with reference to drawings.

[1. Configuration of Magnetic Recording-Reproducing Unit]

Figure 1:
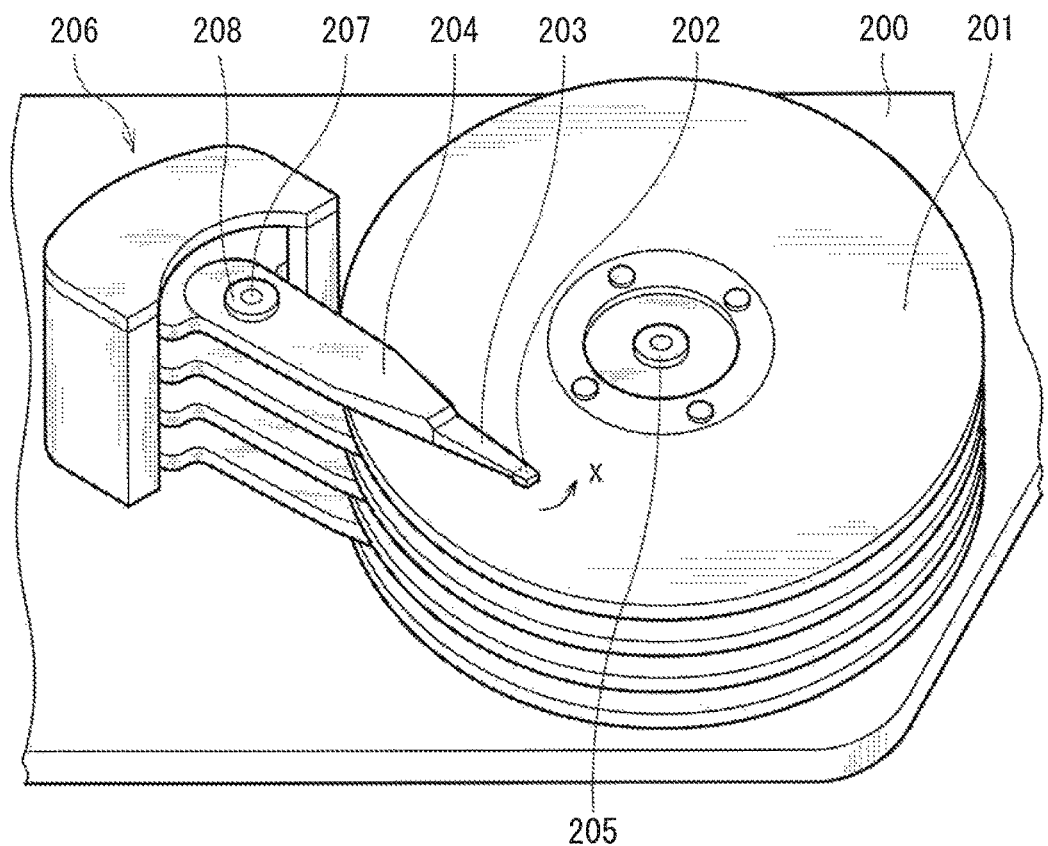
FIG. 1 is a perspective view illustrating a configuration of a magnetic recording-reproducing unit as an embodiment of the invention.
Figure 2:
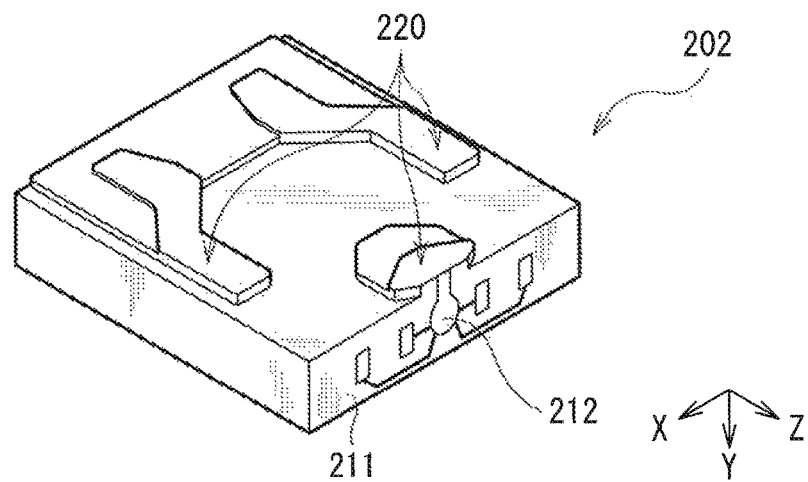
FIG. 2 is a perspective view illustrating a configuration of a main part of FIG. 1 in an enlarged manner.

First, with reference to FIG. 1 and FIG. 2, a configuration of a magnetic recording-reproducing unit mounted with a thin film magnetic head is described. FIG. 1 illustrates a perspective configuration of an entire magnetic recording-reproducing unit, and FIG. 2 illustrates a perspective configuration of a main part of the magnetic recording-reproducing unit.

The magnetic recording-reproducing unit may be, for example, a hard disk drive, and may include, in a housing 200, a plurality of magnetic disks (hard disks) 201 as magnetic recording media, a plurality of suspensions 203 that is disposed to correspond to the magnetic disks 201 and each has one end supporting a magnetic head slider 202, and a plurality of arms 204 each supporting the other end of each of the suspensions 203, as illustrated in FIG. 1. The magnetic disk 201 is rotatable around a spindle motor 205 fixed to the housing 200. The arm 204 is connected to a drive section 206 serving as a power source, and is pivotable around a fixed shaft 207 fixed to the housing 200 through a bearing 208. The drive section 206 may include, for example, a drive source such as a voice coil motor. The magnetic recording unit may be, for example, a model in which the plurality of arms 204 is integrally pivotable around the fixed shaft 207. Incidentally, in FIG. 1, the housing 200 is partially cut out to facilitate visualization of an inner configuration of the magnetic recording unit.

In addition, although four magnetic disks 201 are illustrated in FIG. 1, the number of the magnetic disks 201 is not specifically limited and may be one. The detailed configuration of the magnetic disk 201 will be described later.

As illustrated in FIG. 2, for example, the magnetic head slider 202 may be configured by forming a thin film magnetic head 212 as the above-described thin film magnetic head on one surface of a base material 211 that has a substantially rectangular parallelepiped structure formed of a non-magnetic material such as AlTiC ($Al_2O_3.TiC$). For example, a concavo-convex structure to reduce air resistance generated at the time when the arm 204 pivots may be provided on one surface (an air bearing surface 220) of the base material 211, and the thin film magnetic head 212 is formed on the other surface (a surface on a front right side in FIG. 2) orthogonal to the air bearing surface 220. When the magnetic disk 201 rotates at the time of recording or reproducing information, the magnetic head slider 202 floats above a recording surface (a surface facing the magnetic head slider 202) of the magnetic disk 201 by using air flow generated between the recording surface of the magnetic disk 201 and the air bearing surface 220. Note that, in FIG. 2, the magnetic head slider 202 upside down from the state of FIG. 1 is illustrated to facilitate visualization of the configuration on the air bearing surface 220 side of the magnetic head slider 202.

In the magnetic recording-reproducing unit, when the arm 204 pivots at the time of recording or reproducing information, the magnetic head slider 202 moves to a predetermined recording region on the magnetic disk 201. Then, when power is applied to the thin film magnetic head 212 in a state where that faces the magnetic disk 201, recording processing or reproducing processing is performed on the magnetic disk 201 by the thin film magnetic head 212 based on the above-described operation principle.

[2. Configuration of Thin Film Magnetic Head]

FIGS. 3A and 3B, FIG. 4, and FIG. 5 each illustrate a structure example of the thin film magnetic head 212 that includes a perpendicular magnetic recording head mounted on the above-described magnetic recording unit.

Figure 3:
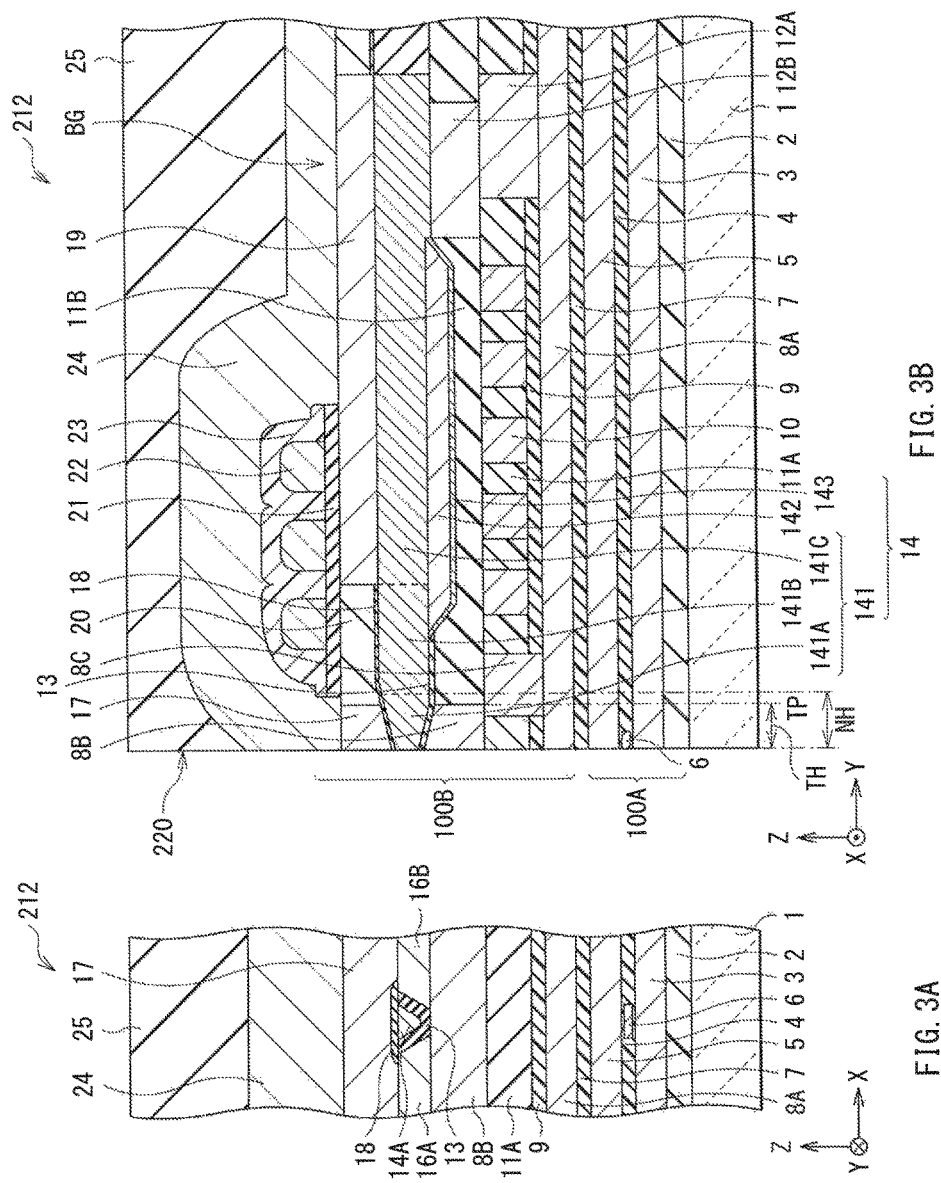
FIGS. 3A and 3B are each a sectional diagram illustrating a structure of a thin film magnetic head illustrated in FIG. 2.
Figure 4:
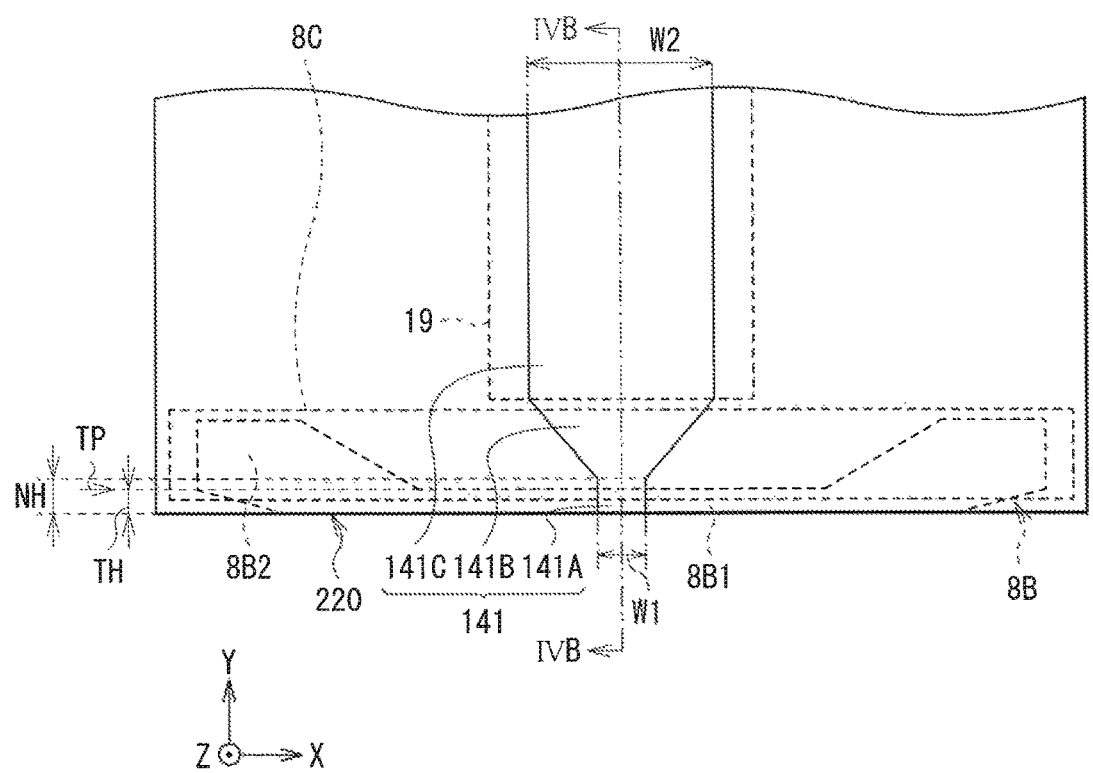
FIG. 4 is a plan view illustrating a structure of a main part of the thin film magnetic head illustrated in FIG. 2.

FIGS. 3A and 3B each illustrate a cross-sectional structure of the entire thin film magnetic head 212. In detail, FIG. 3A illustrates a cross section (an XZ cross section) parallel to the air bearing surface 220, and FIG. 3B illustrates a cross section (an YZ cross section) orthogonal to the air bearing surface 220. FIG. 4 illustrates a planar structure of a main part. In addition, FIG. 5 is a diagram for explaining relationship between the thin film magnetic head 212 and the magnetic disk 201.

Figure 5:
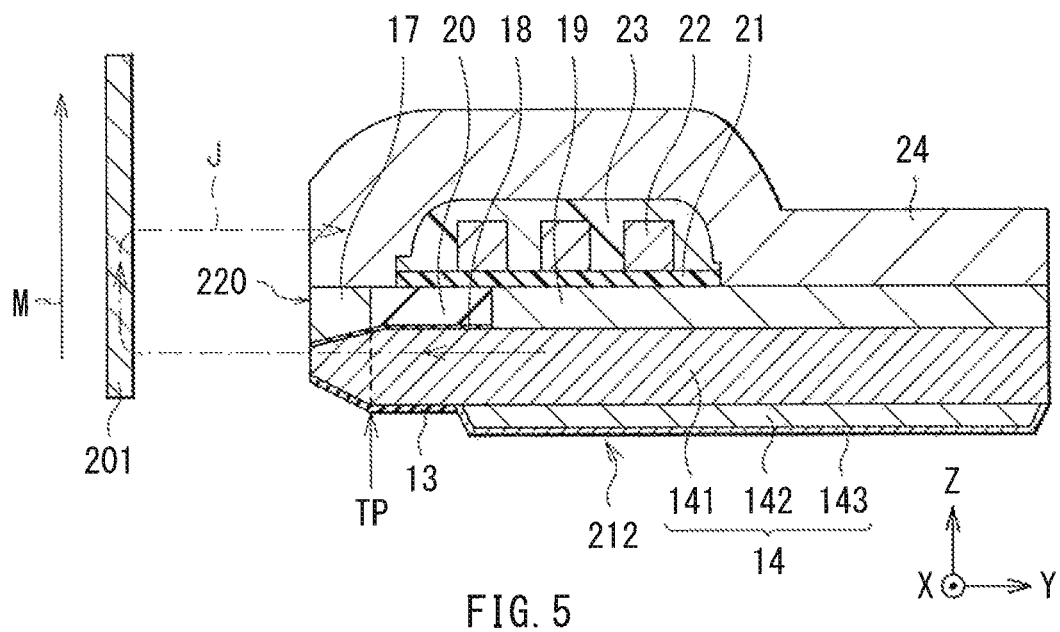
FIG. 5 is a sectional diagram for explaining relationship between the thin film magnetic head illustrated in FIG. 2 and a magnetic disk.

Note that an up-arrow M illustrated in FIG. 5 indicates a direction in which the magnetic disk 201 relatively moves with respect to the thin film magnetic head 212.

In the following description, dimensions in the X-axis direction, the Y-axis direction, and the Z-axis direction are referred to as "width", "height", and "thickness", respectively, and a closer side and a farther side to/from the air bearing surface 220 in the Y-axis direction are referred to as "forward" and "backward", respectively. Moreover, frontward and rearward in the direction of the arrow M are referred to as "trailing side" and "leading side", respectively, and the X-axis direction and the Z-axis direction are referred to as "cross track direction" and "down track direction", respectively.

The thin film magnetic head 212 performs magnetic process on the magnetic disk 201, and may be, for example, a composite head capable of performing both the reproducing processing and the recording processing. For example, as illustrated in FIGS. 3A and 3B, the thin film magnetic head 212 may be configured by stacking an insulating layer 2, a read head section 100A, a separation layer 7, a write head section 100B, and an overcoat 25 in this order on a substrate 1, and has the air bearing surface 220 as a side surface common to these layers and sections.

The insulating layer 2, the separation layer 7, and the overcoat 25 may be each formed of a non-magnetic insulating material such as aluminum oxide. Examples of the aluminum oxide may include alumina ($Al_2O_3$).

The read head section 100A uses magneto-resistive effect (MR) to perform the reproducing processing. The read head section 100A may be configured by stacking, for example, a lower lead shield 3, a shield gap 4, and an upper lead shield 5 in this order. An MR element 6 as a read element is so embedded in the shield gap 4 as to allow one end surface of the MR element 6 to be exposed on the air bearing surface 220.

The lower lead shield 3 and the upper lead shield 5 each magnetically separate the MR element 6 from its surroundings, and extend backward from the air bearing surface 220. In addition, when the MR element 6 is a tunneling magneto-resistive effect element (TMR element) or a CPP (current perpendicular-to-Plane) type magneto-resistive effect element, the lower lead shield 3 and the upper lead shield 5 function as a lead that is a path supplying a current to the MR element 6. The lower lead shield 3 may be formed of, for example, a magnetic material such as nickel iron alloy (NiFe). For example, the nickel iron alloy may be Permalloy (trade name), or others in which the content of nickel is 80 wt % and the content of iron is 20 wt %. The upper lead shield 5 may be formed of, for example, a magnetic material such as Permalloy. Incidentally, the lower lead shield 3 and the upper lead shield 5 may have a single-layer structure, or may have a multilayer structure in which, for example, a non-magnetic layer (formed of, for example, a non-magnetic conductive material such as ruthenium (Ru) or a non-magnetic insulating material such as alumina) is sandwiched between a pair of magnetic layers (formed of a magnetic material such as Permalloy).

The shield gap 4 electrically separates the MR element 6 from its surroundings, and may be formed of, for example, a non-magnetic insulating material such as alumina. The MR element 6 uses giant magneto-resistive effect (GMR), tunneling magneto-resistive effect (TMR), or the like to perform the reproducing processing.

The write head section 100B is a perpendicular magnetic write head performing recording processing of a perpendicular magnetic recording system. The write head section 100B may be configured by stacking, on the separation layer 7, for example, a magnetic layer 8A, an insulating layer 9, a thin film coil 10 and a recess shield 8C that are embedded in an insulating layer 11A, a leading shield 8B having an end surface exposed on the air bearing surface 220 and an insulating layer 11B located on a backward thereof, an insulating layer 13, a main magnetic pole 14 and a pair of side shields 16A and 16B, a trailing gap 18, a pedestal yoke 17, a top yoke 19, an insulating layer 20, a thin film coil 22 embedded in insulating layers 21 and 23, and a write shield 24 in this order. The pedestal yoke 17 and the write shield 24 integrally configure a trailing shield. The magnetic layer 8A and the main magnetic pole 14 are magnetically connected to each other by a coupling part 12A provided on a backward of the thin film coil 10 and a coupling part 12B provided on the coupling part 12A on a backward of the leading shield 8B.

The magnetic layer 8A functions as a return path (or a return shield) on the leading side, and may be formed of, for example, a magnetic material such as NiFe and CoNiFe. The magnetic layer 8A is connected to the main magnetic pole 14 through other magnetic layers (the coupling part 12A and the coupling part 12B) and a part of recording magnetic field emitted from the main magnetic pole 14 is dispersed to the leading side so that WATE (wide adjacent track erase) effective magnetic field is reduced. The WATE effective magnetic field means effective magnetic field affecting adjacent tracks within a wide range (for example, two to ten tracks adjacent to a track to be written).

The thin film coil 10 generates leakage-suppression magnetic flux mainly to suppress unintentional reaching (leakage) of recording-use magnetic flux, which is generated by the thin film coil 22, to the read head section 100A. The thin film coil 10 may be formed of, for example, a high conductive material such as copper (Cu), and has a structure (a spiral structure) winding around a back gap BG.

The insulating layers 11A, 11B, and 13 each electrically separate the thin film coil 10 from its surroundings. The insulating layer 11 may be formed of, for example, a non-magnetic insulating material such as photoresist flowing at heating, spin on glass (SOG), and alumina.

The recess shield 8C is provided at a position recessed from the air bearing surface 220 in a height direction (in the Y-axis direction). In other words, the insulating layer 11A is provided between the recess shield 8C and the air bearing surface 220. In addition, in the thickness direction (in the Z-axis direction), the insulating layer 11B and the insulating layer 13 are provided between the recess shield 8C and the main magnetic pole 14.

The main magnetic pole 14 takes therein magnetic flux generated by the thin film coil 22, and emits the magnetic flux from the air bearing surface 220 to generate recording magnetic field. The main magnetic pole 14 extends backward from the air bearing surface 220, and may be formed of, for example, a magnetic material with high saturation magnetic flux density such as iron-based alloy. Examples of the iron-based alloy may include iron cobalt alloy (FeCo) and iron cobalt nickel alloy (FeCoNi). The main magnetic pole 14 may desirably have a saturation magnetic flux density Bs of 2.0 T (tesla) or larger as a whole.

The main magnetic pole 14 includes a low-specific resistance region 141 that has a first specific resistance and has an end surface exposed on the air bearing surface 220, and a high-specific resistance region 142 that has a second specific resistance higher than the first specific resistance, for example, 38 µΩ·cm or larger and is located at a position recessed from the air bearing surface 220. Although there is no upper limit of the specific resistance of the high-specific resistance region 142, when the high-specific resistance region 142 is formed of, for example, a mixed material of FeCo and $ZrO_2$, the specific resistance becomes 114 µΩ·cm in the case where the saturation magnetic flux density Bs of 2.0 T or larger is ensured in the entire main magnetic pole 14.

The high-specific resistance region 142 is located below the low-specific resistance region 141 and is in contact with the low-specific resistance region 141. The high-specific resistance region 142 may be in contact with the insulating layer 11B located therebelow or may further include a base layer 143 below the high-specific resistance region 142. In this case, the main magnetic pole 14 has a structure in which the base layer 143, the high-specific resistance region 142, and the low-specific resistance region 141 are stacked and formed in order on the insulating layer 11B. The low-specific resistance region 141 may be formed of, for example, FeCo or FeCoNi, and the high-specific resistance region 142 is formed of a mixed material obtained by mixing a high-specific resistance material containing one or more of $ZrO_2$, $SiO_2$, $Al_2O_3$, and MgO, with FeCo.

In the high-specific resistance region 142, the high-specific resistance material such as $ZrO_2$ may desirably account for 7 at % or lower of the mixed material, for example. This is because 2.0 T or larger of the saturation magnetic flux density Bs of the entire main magnetic pole 14 is easily ensured. In this case, the content of Co to Fe in FeCo of the mixed material may be preferably, for example, 20 at % or larger and 50 at % or lower.

Moreover, the base layer 143 may be formed of, for example, Ru (ruthenium), NiFe, or CoFeNi. Both of NiFe and CoFeNi may preferably have an fcc structure.

The thickness of the low-specific resistance region 141 may be preferably larger than the thickness of the high-specific resistance region 141. Therefore, the low-specific resistance region 141 may be preferably formed by, for example, plating. On the other hand, the high-specific resistance region 142 may be preferably formed by, for example, sputtering or the like. Incidentally, the thickness of the high-specific resistance region 142 may be set to, for example, about 25% or more and about 55% or less of the thickness of the low-specific resistance region 141.

As illustrated in FIG. 4, for example, the low-specific resistance region 141 may have an integrated structure in which a front end section 141A having a uniform width W1 (a first width) defining a write track width, a mid-section 141B having a width that gradually increases from the width W1 up to a width W2 (a second width; W2>W1) larger than the width W1, and a rear end section 141C having the uniform width W2 are connected in this order backward from the air bearing surface 220.

The rear end section 141C may have a shape overlapping all or a part of the top yoke 19, for example. A position where the width of the low-specific resistance region 141 starts to increase from the front end section 141A to the mid-section 141B, namely, a position where the width of the low-specific resistance region 141 starts to increase from the width W1 defining the write track width is a neck height NH that is one of important factors determining recording performance of the thin film magnetic head.

The front end section 141A is a section substantially emitting recording-use magnetic flux, which is generated by the thin film coil 22, toward the magnetic disk 201, and is so extended in the Y-axis direction as to have the uniform width W1 over the entire section.

The mid-section 141B is a section supplying magnetic flux taken in the top yoke 19 to the front end section 141A. The width of the mid-section 141B gradually increases from the width W1 to the width W2, namely, the mid-section 141B has the width W1 at a part connected with the front end section 141A, and has the width W2 at a part connected with the rear end section 141C.

The rear end section 141C is a section supplying the magnetic flux taken in the top yoke 19 to the front end section 141A, similarly to the mid-section 141B. The rear end section 141C is so extended in the Y-axis direction as to have the uniform width W2 over the entire section as described above.

For example, the high-specific resistance region 142 may be so provided as to occupy a region corresponding to a part of the mid-section 141B and a region corresponding to a part or all of the rear end section 141C. Alternatively, the high-specific resistance region 142 may be so provided as to occupy only the region corresponding to a part or all of the rear end section 141C.

The thickness of the main magnetic pole 14 may be uniform over all or may be partially varied. Here, for example, the thickness of the front end section 141A may gradually decrease with decrease in distance from the air bearing surface 220, as compared with the uniform thickness of the rear end section 141C. Here, both of the surfaces on the trailing side and on the leading side of the front end section 141A are inclined. In addition, the lower surface of the mid-section 141B has two slopes, and the thickness of the mid-section 141B stepwisely increases with increase in distance from the air bearing surface 220.

The main magnetic pole 14 is surrounded by the insulating layer 13 and the trailing gap 18 in the vicinity of the air bearing surface 220, and is mutually separated and magnetically shielded from the leading shield 8B, the side shields 16A and 16B, and the pedestal yoke 17. However, the main magnetic pole 14 is connected to the leading shield 8B through the coupling parts 12A and 12B at the backward of the thin film coil 10 as described above.

The insulating layer 13 also functions as a side gap, and magnetically separates the main magnetic pole 14 from the pair of side shields 16A and 16B in the width direction (in the write track width direction=in the X-axis direction). A part functioning as the side gap of the insulating layer 13 is provided between the main magnetic pole 14 and the pair of side shields 16A and 16B, and is adjacent to both sides in the width direction of the main magnetic pole 14 (hereinafter, simply referred to as "both sides").

The trailing gap 18 magnetically separates the main magnetic pole 14 from the pedestal yoke 17 in the thickness direction (a direction intersecting with the write track width direction=the Z-axis direction), and is also called a write gap. The trailing gap 18 is provided between the main magnetic pole 14 and the pedestal yoke 17. Note that the trailing gap 18 may be formed of, for example, a non-magnetic material such as alumina.

Each of the leading shield 8B, the recess shield 8C, the pedestal yoke 17, and the side shields 16A and 16B may be formed of, for example, a magnetic material similar to that of the low-specific resistance region 141 of the main magnetic pole 14, and mainly takes in magnetic flux in the vicinity of the air bearing surface 220 to prevent that magnetic flux from spreading. As a result, the gradient of the recording magnetic field is increased, the write track width is narrowed, and the magnetic field component in an oblique direction is accordingly generated in the recording magnetic field. The leading shield 8B, the pedestal yoke 17, and the side shields 16A and 16B extend backward from the air bearing surface 220 in a middle region in the width direction, and may be terminated at the neck height NH, for example. Accordingly, the pedestal yoke 17 and the side shields 16A and 16B are adjacent to the insulating layer 20 on the backward thereof, and play a role to define the front-most end position (a throat height zero position TP) of the insulating layer 20.

As illustrated in FIG. 4, for example, the recess shield 8C may be a rectangular member extending in the width direction, and the front end thereof may be located at a position that is recessed from the air bearing surface 220, forward of the throat height zero position TP. Therefore, the leading shield 8B and the recess shield 8C are partially overlapped and in contact with each other.

The leading shield 8B has an end surface exposed on the air bearing surface 220, as well as has a mid-part 8B1 extending in the width direction and a pair of wing parts 8B2 connected to respective ends thereof and each expanding in a direction (+Y direction) away from the air bearing surface 220. The pair of wing parts 8B2 of the leading shield 8B may be preferably formed so as not to overlap with the mid-section 141B and the rear end section 141C of the low-specific resistance region 141 of the main magnetic pole 14, for example. This is because the magnetic flux that travels from the rear end section 141C to the front end section 141A via the mid-section 141B is avoided from directly leaking into the leading shield 8B. Incidentally, the shape of the leading shield 8B is not limited to that illustrated in FIG. 4, and may be variously shaped.

The insulating layer 20 is provided on a backward of the pedestal yoke 17. The insulating layer 20 defines a throat height TH that is one of the important factors determining recording performance of the thin film magnetic head, and is surrounded by the top yoke 19, the pedestal yoke 17, and the side shields 16A and 16B. A front-most end position of the insulating layer 20 is the throat height zero position TP as described above, and a distance between the throat height zero position TP and the air bearing surface 220 is defined as the throat height TH. The insulating layer 20 may be formed of, for example, a non-magnetic material such as alumina.

Incidentally, in FIG. 3B and FIG. 4, for example, the case where the throat height zero position TP is positioned on a more front side (on the ABS side) than the neck height NH is illustrated. However, the throat height zero position TP may be coincident with the neck height NH, or the throat height zero position TP may be positioned on a more rear side than the neck height NH.

The top yoke 19 functions as an auxiliary magnetic-flux taking part to supply magnetic flux to the main magnetic pole 14, and for example, may be formed of a magnetic material similar to or different from that of the main magnetic pole 14. The top yoke 19 extends backward from a position recessed from the air bearing surface 220 on the trailing side of the main magnetic pole 14, and a lower surface thereof is connected with the main magnetic pole 14. The top yoke 19 may have a rectangular planar shape with a width larger than the width W2, for example, as illustrated in FIG. 4. However, the width of the top yoke 19 may be smaller than the width W2. The thin film coil 22 generates a recording-use magnetic flux, and in the thin film coil 22, for example, a current may flow in a direction opposite to that of the current flowing through the thin film coil 10. Note that the detailed structure of the thin film coil 22 may be similar to that of the thin film coil 10, for example. In addition, instead of the thin film coils 10 and 22 having a spiral structure winding in the stacked-surface as described above, a helical coil that has a structure winding around the main magnetic pole 14 and the top yoke 19 while proceeding in the Y-axis direction, may be employed.

The insulating layers 21 and 23 each electrically separate the thin film coil 22 from its surroundings, and are connected with the insulating layer 20. The insulating layer 21 may be formed of, for example, a non-magnetic insulating material such as alumina, and the insulating layer 23 may be formed of, for example, a non-magnetic insulating material such as photoresist, spin on glass (SOG), and alumina. The front-most end of each of the insulating layers 21 and 23 may be recessed from the front-most end of the insulating layer 20, for example.

The write shield 24 mainly takes in magnetic flux returning from the magnetic disk 201 to the write head section 100B, and circulates the magnetic flux therebetween. The circulation function for this magnetic flux is provided by not only the write shield 24 but also the side shields 16A and 16B and the pedestal yoke 17, in some cases. The write shield 24 is positioned on the trailing side of the side shields 16A and 16B, the pedestal yoke 17, and the top yoke 19, and extends backward from the air bearing surface 220 as a starting point. The write shield 24 is connected with the pedestal yoke 17 on the front side thereof, and is connected with the top yoke 19 at the back gap BG on the rear side thereof. In addition, the write shield 24 may be formed of, for example, a magnetic material similar to that of the main magnetic pole 14, and has a rectangular planar shape with a width larger than the width of the top yoke 19 and the width of the main magnetic pole 14. Note that the write shield 24 may be formed of a magnetic material different from that of the main magnetic pole 14.

[3. Method of Manufacturing Thin Film Magnetic Head]

Next, an example of a method of manufacturing the thin film magnetic head 212 is described with reference to FIG. 6 to FIG. 20, in addition to FIGS. 3A and 3B. FIG. 6 to FIG. 20 are sectional diagrams for explaining steps of forming a main part of the thin film magnetic head 212, and correspond to a part of FIG. 3B. Note that, in FIG. 6 to FIG. 20, illustration of the components from the substrate 1 up to the separation layer 7 is omitted. In addition, in FIG. 15 to FIG. 20, illustration of the components located lower than a layer that includes the leading shield 8B, the insulating layer 11B, and the coupling part 12B is omitted. The details of materials, dimensions, shapes, and the like of a series of components which have been already described will be appropriately omitted in the following description about the method of manufacturing the thin film magnetic head 212.

The thin film magnetic head 212 is mainly manufactured by sequentially forming and stacking a series of components using an existing thin film process. The existing thin film process may be, for example, film formation techniques such as electrolytic plating and sputtering, patterning techniques such as photolithography, etching techniques such as dry etching and wet etching, and polishing techniques such as chemical mechanical polishing (CMP).

First, as illustrated in FIGS. 3A and 3B, the insulating layer 2 is formed on the substrate 1. Subsequently, the lower lead shield 3, the shield gap 4 embedded with the MR element 6, and the upper lead shield 5 are stacked and formed in this order on the insulating layer 2 to form the read head section 100A. Then, the separation layer 7 is formed on the read head section 100A.

Figure 6:
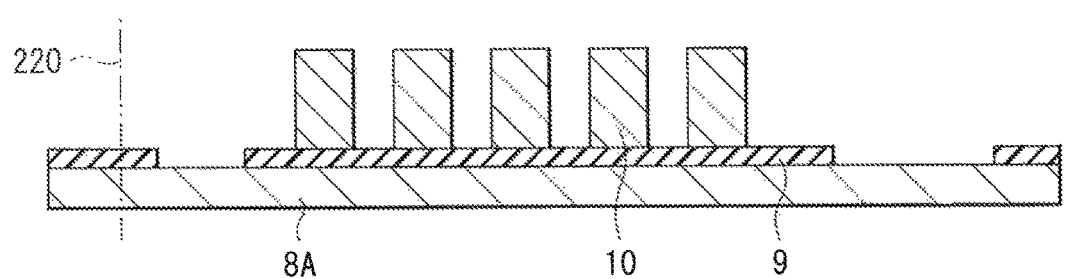
FIG. 6 is a sectional diagram for explaining a step of forming the main part of the thin-film magnetic head.

Subsequently, the magnetic layer 8A is formed on the separation layer 7, and the insulating layer 9 and the thin film coil 10 are then formed in order at respective predetermined positions on the magnetic layer 8A (FIG. 6).

Figure 7:
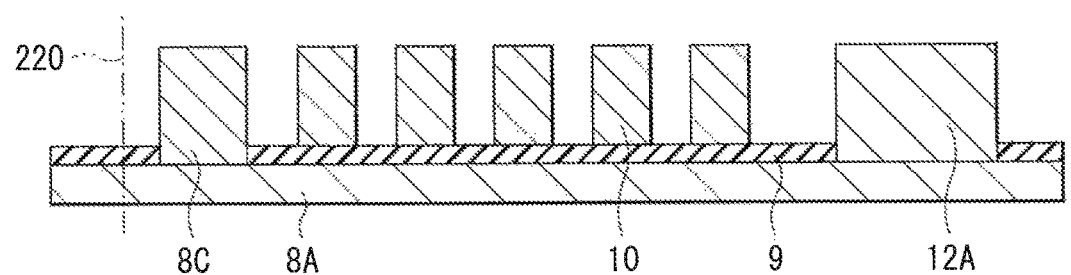
FIG. 7 is a sectional diagram for explaining a step following the step of FIG. 6.

Next, the recess shield 8C is formed on a forward of the thin film coil 10, and the coupling part 12A is formed on a backward of the thin film coil 10 (FIG. 7).

Figure 8:
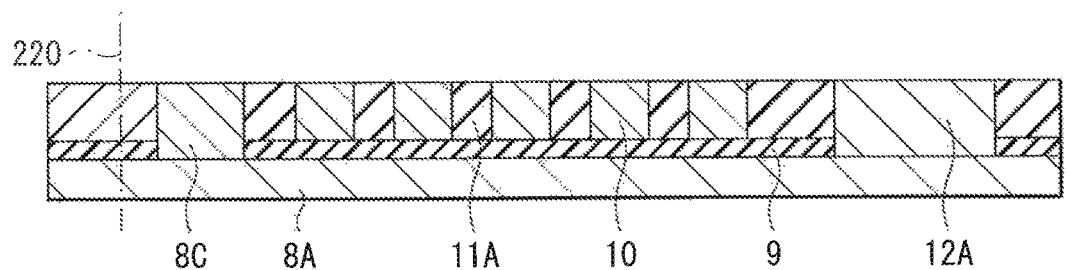
FIG. 8 is a sectional diagram for explaining a step following the step of FIG. 7.

After that, an insulating film is so formed as to cover the entire surface, then flattering treatment is entirely performed to adjust the height of each of the recess shield 8C, the thin film coil 10, and the coupling part 12A, and the upper surfaces of the respective parts are exposed. As a result, surroundings of the recess shield 8C, the thin film coil 10, and the coupling part 12A are in a state of being filled with the insulating layer 11A (FIG. 8).

Figure 9:
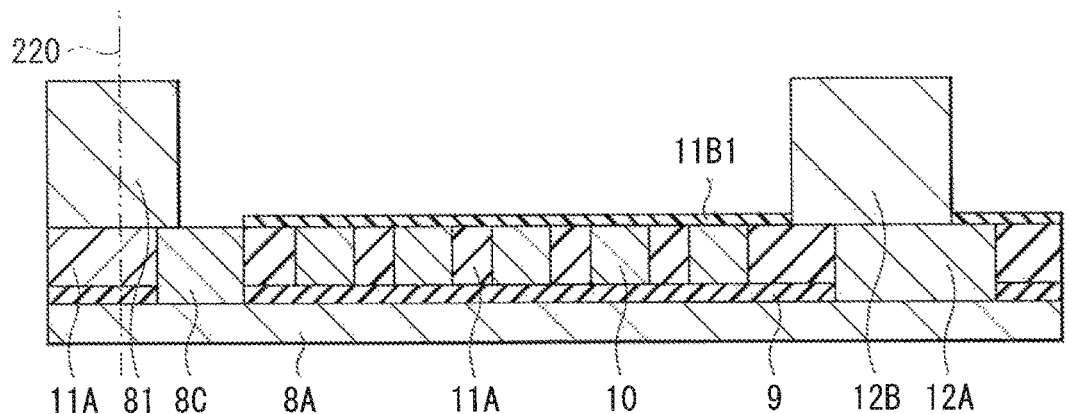
FIG. 9 is a sectional diagram for explaining a step following the step of FIG. 8.

Subsequently, to electrically insulate the thin film coil 10 from its surroundings, an insulating film 11B1 that covers the thin film coil 10 and the insulating layer 11A in the periphery thereof as well as a part of the coupling part 12A is selectively formed. After that, a first layer 81 is formed on a part of the recess shield 8C and on the insulating layer 11A that is positioned forward of the recess shield 8C, and the coupling part 12B is provided on the coupling part 12A (FIG. 9). The first layer 81 is formed of a material forming the leading shield 8B.

Figure 10:
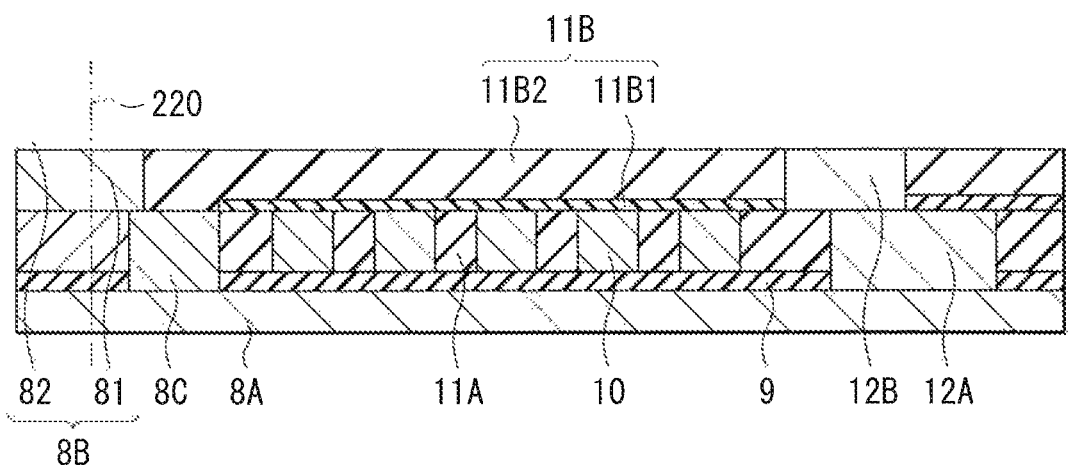
FIG. 10 is a sectional diagram for explaining a step following the step of FIG. 9.

Further, an insulating film 11B2 is so formed as to cover the entire surface, and then the flattering treatment is entirely performed to adjust the height of each of the first layer 81 and the coupling part 12B, and the upper surfaces of these parts are exposed. As a result, the backward of the first layer 81 and the surroundings of the coupling part 12B are put into a state of being filled with the insulating layer 11B (FIG. 10).

Figure 11:
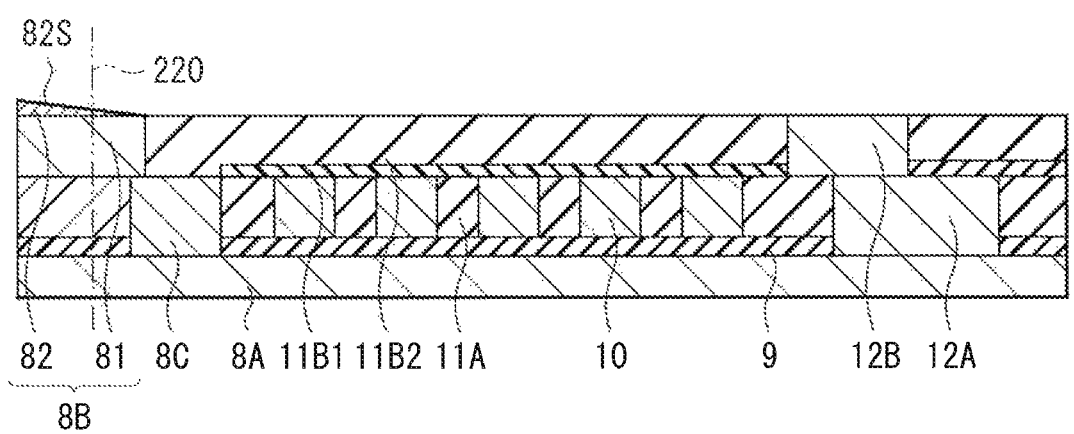
FIG. 11 is a sectional diagram for explaining a step following the step of FIG. 10.

Subsequently, as illustrated in FIG. 11, a second layer 82 is formed on the first layer 81, and then an upper part of the second layer 82 is partially removed to make an inclined upper surface 82S of the second layer 82. As a result, the leading shield 8B configured of the first layer 81 and the second layer 82 is formed. Then, the side shields 16A and 16B are formed in a predetermined region on the leading shield 8B.

Figure 12:
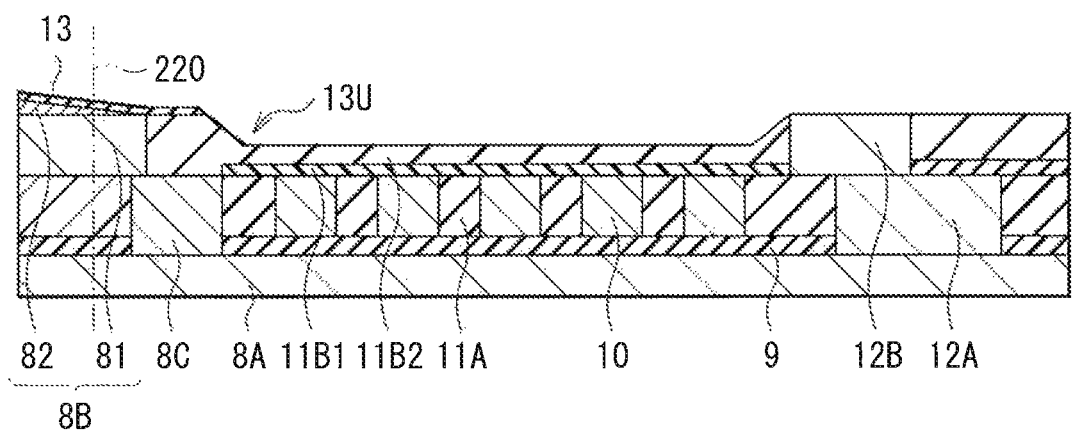
FIG. 12 is a sectional diagram for explaining a step following the step of FIG. 11.

After that, the insulating layer 13 is so formed as to cover the upper surface 82S of the second layer 82, and the insulating film 11B2 in a partial region is slightly dug down to form a concave section 13U (FIG. 12).

Figure 13:
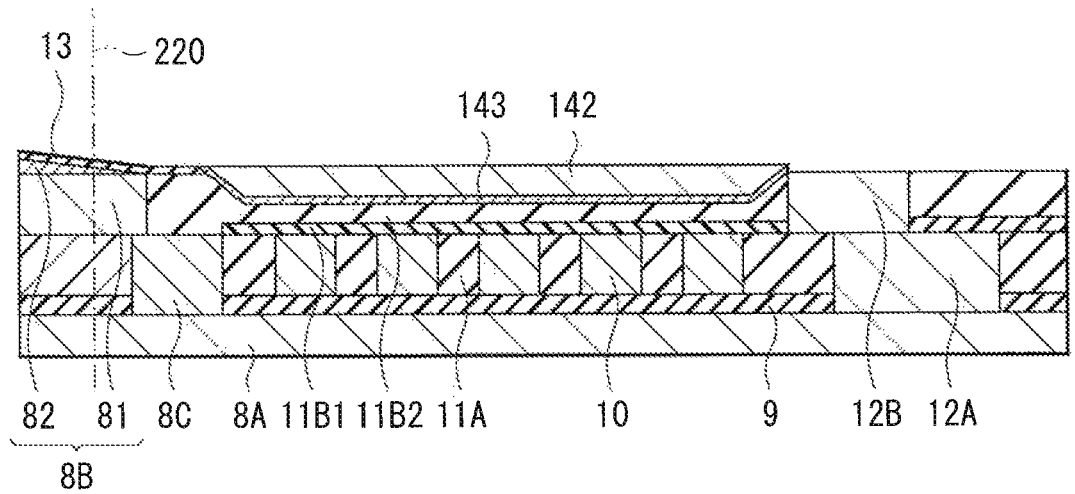
FIG. 13 is a sectional diagram for explaining a step following the step of FIG. 12.

Further, the base layer 143 and the high-specific resistance region 142 are sequentially so formed by, for example, sputtering as to fill the concave section 13U (FIG. 13).

Figure 14:
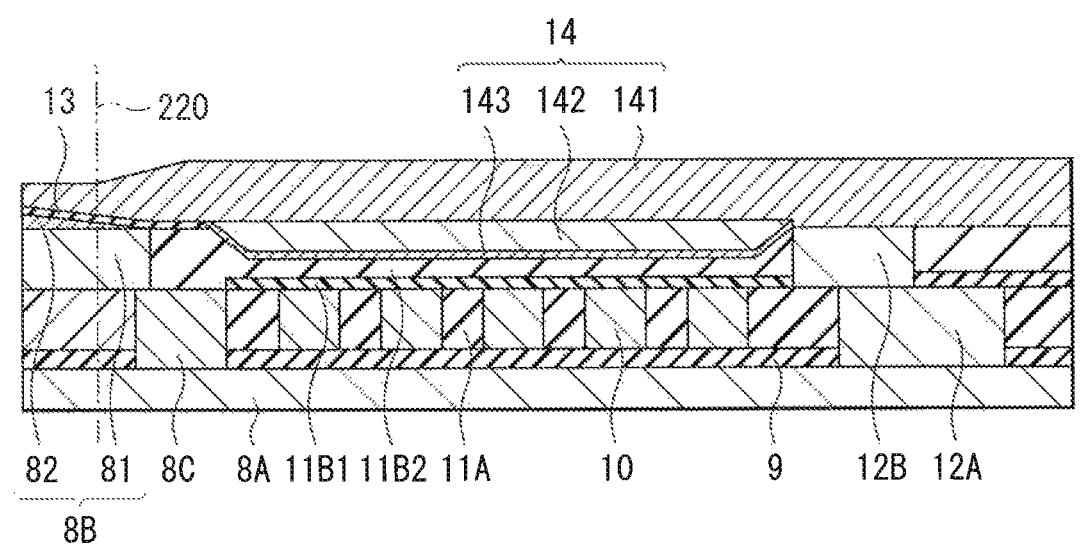
FIG. 14 is a sectional diagram for explaining a step following the step of FIG. 13.

Next, the low-specific resistance region 141 is so formed as to cover the insulating layer 13 and the high-specific resistance region 142 to form the main magnetic pole 14. Further, after an insulating layer (not illustrated) is so formed as to fill the surroundings of the side shields 16A and 16B and the main magnetic pole 14, flattering of the side shields 16A and 16B and the main magnetic pole 14 is performed. After that, an inclined surface is formed on the front part of the main magnetic pole 14 by selective etching (FIG. 14).

Figure 15:
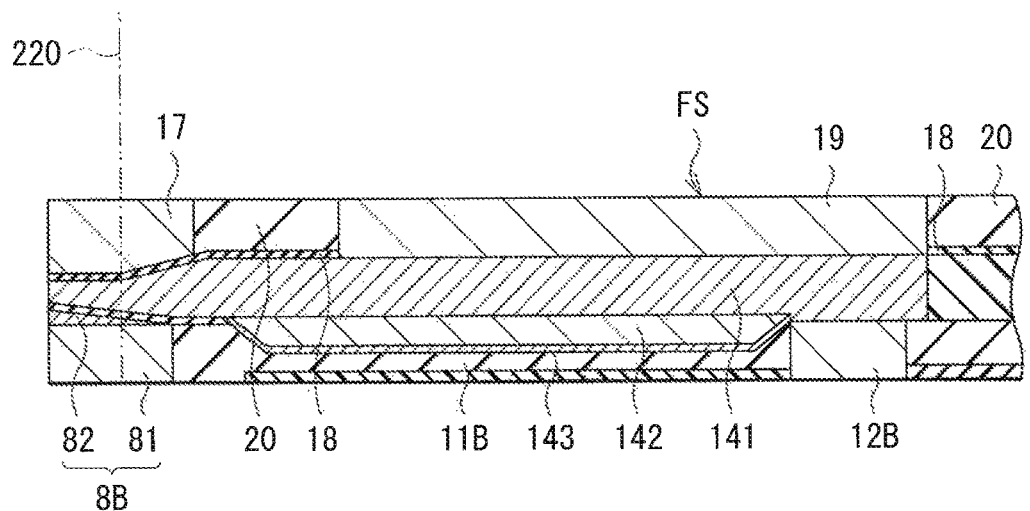
FIG. 15 is a sectional diagram for explaining a step following the step of FIG. 14.

Next, after the trailing gap 18 is formed on the low-specific resistance region 141, the pedestal yoke 17 is formed on the front part thereof, as illustrated in FIG. 15. Further, a part covering the rear end section 141C of the trailing gap 18 is selectively removed, and the top yoke 19 is formed in a region where the trailing gap 18 has been removed. Moreover, the insulating layer 20 is so formed as to fill the space between the pedestal yoke 17 and the top yoke 19 and the surroundings of the top yoke 19, and the pedestal yoke 17, the top yoke 19, and the insulating layer 20 are flattened by the CMP method or the like to obtain a flattering surface FS.

Figure 16:
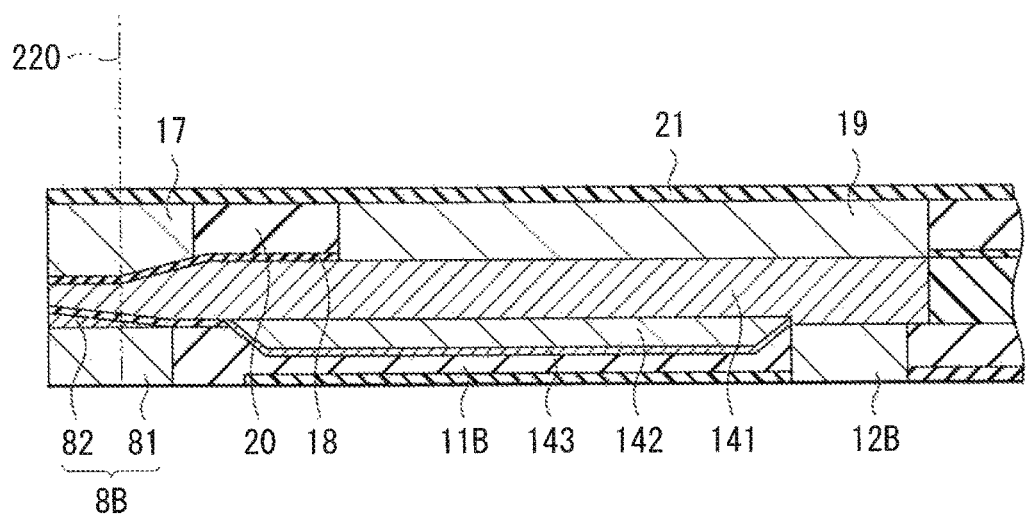
FIG. 16 is a sectional diagram for explaining a step following the step of FIG. 15.
Figure 17:
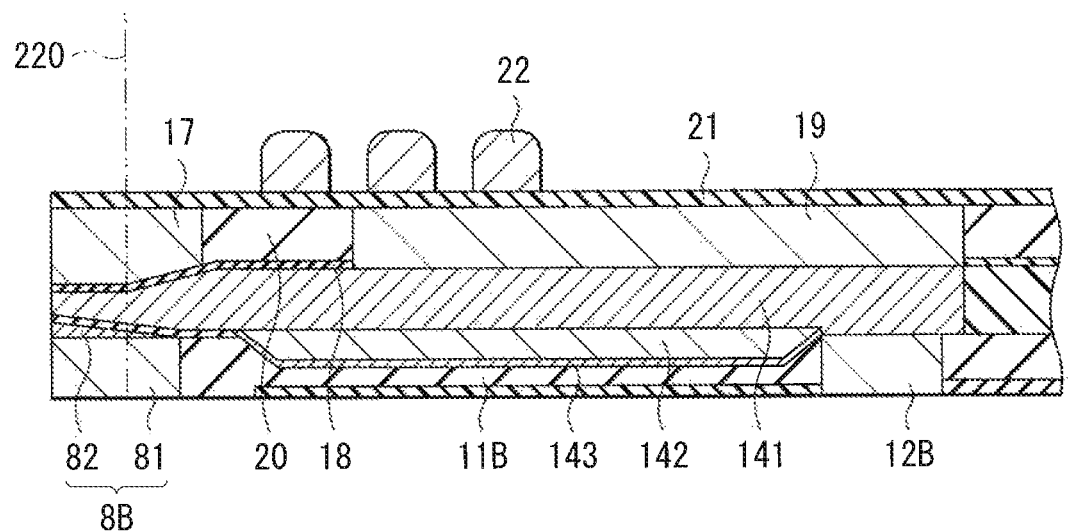
FIG. 17 is a sectional diagram for explaining a step following the step of FIG. 16.

Then, the insulating layer 21 is so formed as to cover the entire flattering surface FS (FIG. 16). Further, a resist mask (not illustrated) having a predetermined pattern shape is formed on the insulating layer 21 by photolithography or the like, and then the thin film coil 22 is formed by plating or the like using the resist mask (FIG. 17).

Figure 18:
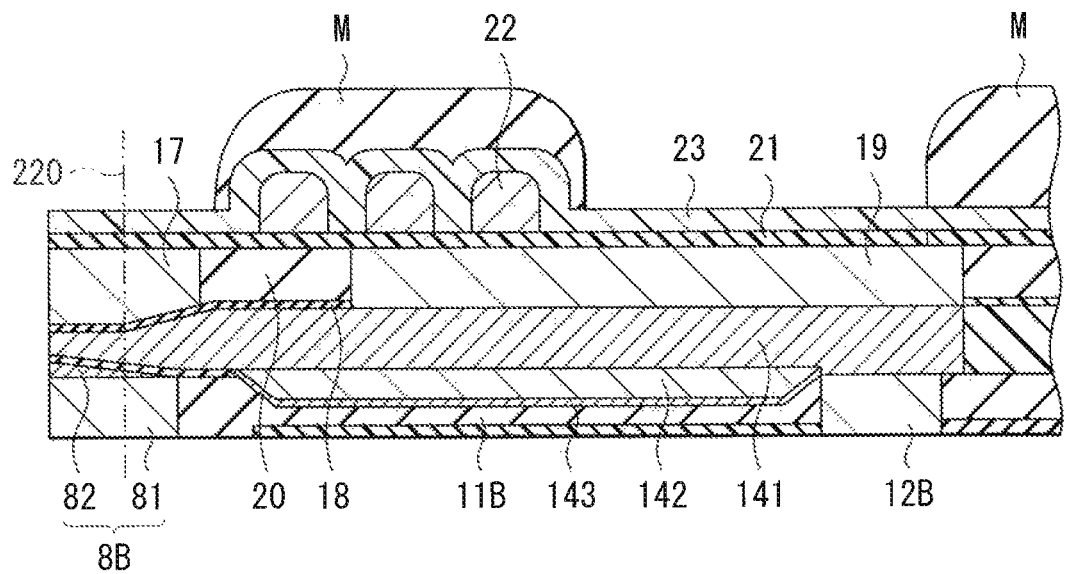
FIG. 18 is a sectional diagram for explaining a step following the step of FIG. 17.

Subsequently, after the insulating layer 23 is so formed as to cover the entire surface, a mask M is selectively formed so as to cover a partial region on the insulating layer 23, as illustrated in FIG. 18.

Figure 19:
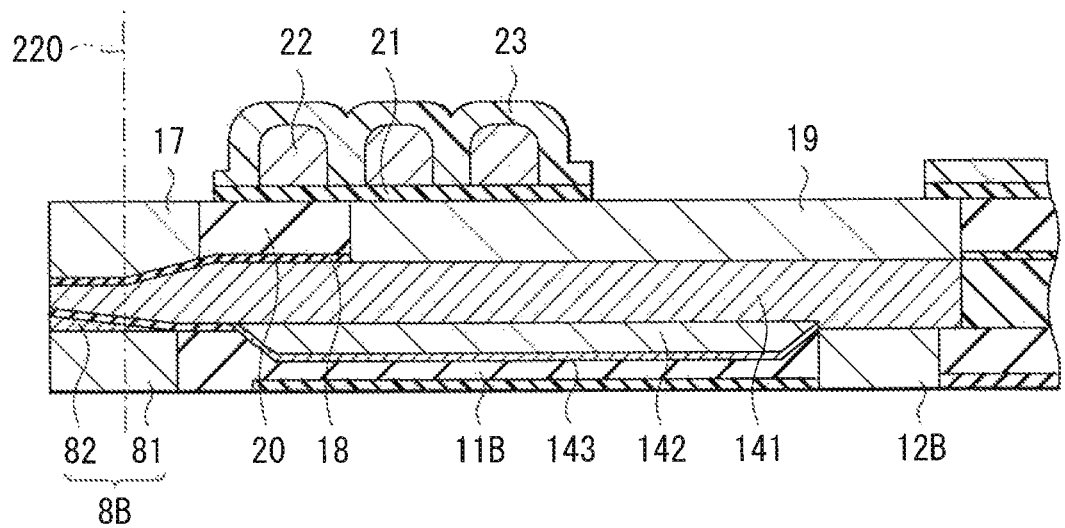
FIG. 19 is a sectional diagram for explaining a step following the step of FIG. 18.

After that, exposed parts not covered with the mask M of the insulating layers 21 and 23 are all removed in the thickness direction by, for example, dry etching treatment such as reactive ion etching (RIE) (FIG. 19). In the dry etching treatment, a condition of selectively removing a non-metal such as alumina rather than a metal is employed. Employing such a condition allows parts of the pedestal yoke 17 and the top yoke 19 to be exposed.

Figure 20:
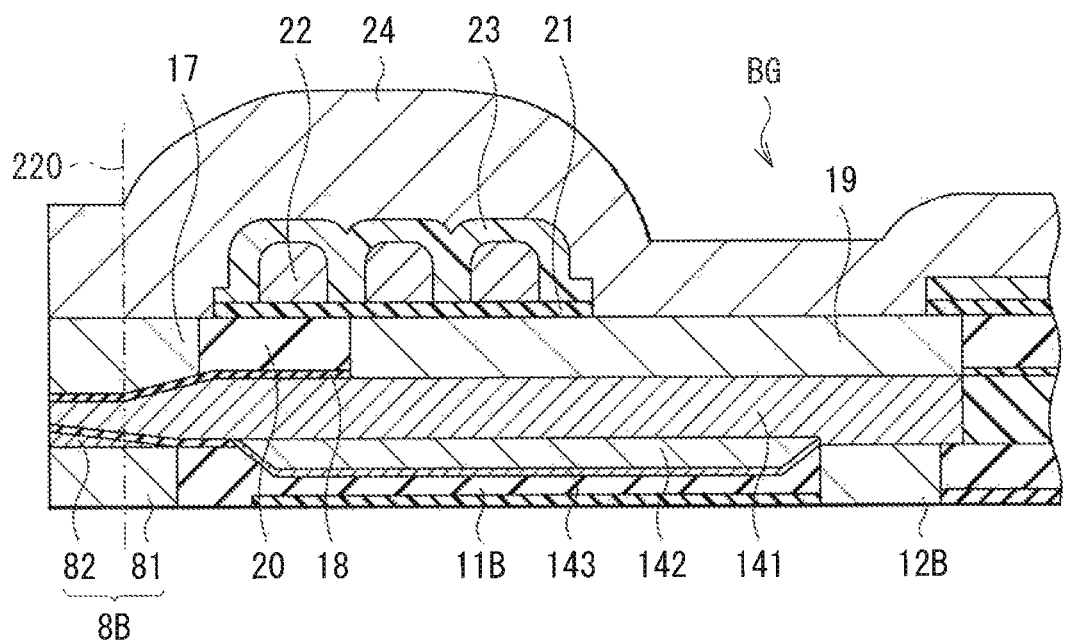
FIG. 20 is a sectional diagram for explaining a step following the step of FIG. 19.

After that, the write shield 24 that magnetically connects the pedestal yoke 17 with the top yoke 19 is formed by depositing a predetermined magnetic material so as to cover the entire surface. As a result, the write head section 100B is formed (FIG. 20).

Finally, the overcoat 25 is formed on the write head section 100B, and then the air bearing surface 220 is formed by polishing together the side surfaces of the staked body from the substrate 1 up to the overcoat 25 using the CMP or the like. Consequently, the thin film magnetic head is completed.

[4. Operation Of Thin Film Magnetic Head]

The thin film magnetic head 212 operates as follows. In recording data in the magnetic disk 201, first, the spindle motor 205 is driven to rotate the magnetic disk 201. The magnetic head slider 202 is accordingly floated above the surface of the magnetic disk 201. On the other hand, a not-illustrated external circuit applies a current to the thin film coil 22 of the write head section 100B to generate magnetic flux J for recording (see FIG. 5). The magnetic flux J is taken in the main magnetic pole 14 and the top yoke 19, and then flows through the inside of the main magnetic pole 14 toward the front end section 141A. At this time, since being focused by the neck height NH, the magnetic flux J eventually converges near a trailing edge. When the magnetic flux J is emitted to the outside and recording magnetic field is accordingly generated, a hard magnetic recording layer (not illustrated) in a region supplied with the recording magnetic field in the magnetic disk 201 is magnetized. As a result, data is magnetically recorded in the magnetic disk 201.

In the thin film magnetic head 212, the current flows through the thin film coils 10 and 22 in directions opposite to each other, and therefore, the magnetic flux is generated therein in directions opposite to each other. In detail, in the thin film coil 22, the magnetic flux for recording is generated toward the leading side, whereas in the thin film coil 10, the magnetic flux for suppressing leakage is generated toward the trailing side. Accordingly, the magnetic flux for recording becomes difficult to leak to the read head section 100A, which suppresses lowering of the detection accuracy of the MR element 6. In addition, the information recorded in the magnetic disk 201 is prevented from being unintentionally deleted due to the unnecessary magnetic field that is generated when the magnetic flux for recording is taken in the lower lead shield 3 and the upper lead shield 5.

In addition, when the magnetic flux J is emitted from the front end section 141A, a part (spread component) of the magnetic flux J is taken in the pedestal yoke 17, the side shields 16A and 16B, and the leading shield 8B, and thus spreading of the recording magnetic field is suppressed and the gradient of the recording magnetic field is increased. The magnetic flux J taken in the pedestal yoke 17 and the side shields 16A and 16B is resupplied to the main magnetic pole 14 through the write shield 24 and the leading shield 8B.

Note that the magnetic flux J emitted from the main magnetic pole 14 toward the magnetic disk 201 magnetizes the hard magnetic recording layer in the magnetic disk 201 and then returns to the write shield 24, and is resupplied to the main magnetic pole 14. Therefore, the magnetic flux J circulates between the write head section 100B and the magnetic disk 201, thereby building a magnetic circuit.

On the other hand, at the time of reproduction, when a sense current flows through the MR element 6 of the read head section 100A, the resistance value of the MR element 6 varies in response to signal magnetic field for reproduction in the magnetic disk 201. The resistance variation is detected as voltage variation so that information recorded in the magnetic disk 201 is magnetically reproduced.

[5. Experimental Examples]

Experimental Examples 1-1 TO 1-4

The main magnetic pole 14 has the high-specific resistance region 142 formed on the base layer 143, and thus the coercive force Hc is reduced and the main magnetic pole 14 has the high magnetic permeability. Therefore, relationship between the coercive force Hc and the material of the base layer 143 in a case where a mixed material obtained by adding $ZrO_2$ to $Fe_{0.7}Co_{0.3}$ such that $ZrO_2$ accounts for 7 at % or lower of the total was used for the high-specific resistance region 142 was examined. The results are illustrated in Table 1. Here, the experiment was performed for a case where the base layer 143 was not formed at all (experimental example 1-1), and for cases where the base layer 143 was formed to have a thickness of 3 nm with use of each of Ru (experimental example 1-2), NiFe having the fcc structure (experimental example 1-3), and CoFeNi having the fcc structure (experimental example 1-4). Incidentally, the thickness of the high-specific resistance region 142 was 50 nm in any case. In addition, in Table 1, Hcx indicates coercive force in a direction horizontal to the air bearing surface 220, and Hcy indicates coercive force in a direction perpendicular to the air bearing surface 220.

TABLE 1

|  | Base Layer | Hcy(Oe) | Hcx(Oe) |
| --- | --- | --- | --- |
| Experimental Example 1-1 | None | 90.2 | 79.8 |
| Experimental Example 1-2 | Ru | 2.5 | 9.4 |
| Experimental Example 1-3 | NiFe | 1.6 | 9.0 |
| Experimental Example 1-4 | CoFe | 2.0 | 9.6 |

As illustrated in Table 1, it was found that the experimental examples 1-2 to 1-4 in which the base layer 143 is formed each exhibit the coercive force Hcx and Hcy sufficiently lower than those of the experimental example 1-1 in which the base layer 143 is not provided.

Experimental Examples 2-1 TO 2-3

Figure 21:
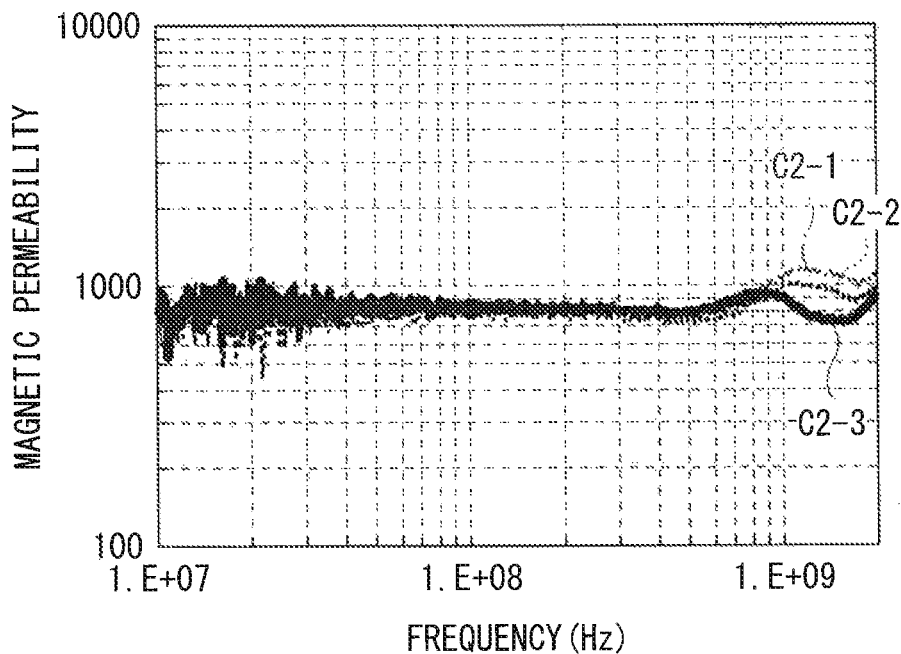
FIG. 21 is a characteristic diagram illustrating frequency characteristics of magnetic permeability in experimental examples 2-1 to 2-3.

As described above, it was found that forming the base layer 143 makes it possible to achieve improvement in soft magnetic characteristics of the high-specific resistance region 142. However, in the case where the base layer 143 is formed of a ferromagnetic material, there is fear that the magnetic permeability of the high-specific resistance region 142 in the high frequency region is lowered depending on the film thickness of the base layer 143. Therefore, a sample of the stacked-layer structure of the base layer 143 and the high-specific resistance region 142 was fabricated, and relationship between the film thickness of the base layer 143 and the magnetic permeability of the high-specific resistance region 142 was examined. The results are illustrated in FIG. 21. In FIG. 21, the lateral axis indicates a measurement frequency [Hz], and the vertical axis indicates the magnetic permeability. Here, the base layer 143 was formed to have a thickness of 3 nm (experimental example 2-1), 11 nm (experimental example 2-2), and 46 nm (experimental example 2-3), with use of NiFe. In addition, the high-specific resistance region 142 was formed to have a film thickness of 200 nm with use of a mixed material that was obtained by adding $ZrO_2$ to $Fe_{0.7}Co_{0.3}$ such that the $ZrO_2$ accounts for 7 at % or lower of the total.

As illustrated in FIG. 21, it was found that, in the high frequency region of $1 \times 10^9$ or higher, the experimental example 2-1 exhibits the highest magnetic permeability, and the experimental example 2-3 exhibits the lowest magnetic permeability. Therefore, it was found that the thickness of the base layer 143 is preferably formed as thin as possible, for example, 3 nm or lower in the case where the base layer 143 is formed of the ferromagnetic material.

Experimental Examples 3-1 AND 3-2

Next, the base layer 143 was formed to have a film thickness of 3 nm with use of CoFeNi, and the high-specific resistance region 142 was formed to have a film thickness of 200 nm with use of a mixed material that is obtained by adding $ZrO_2$ to $Fe_{0.7}Co_{0.3}$ such that $ZrO_2$ accounts for 7 at % or lower of the total. Except for these points, a sample of the stacked-layer structure of the base layer 143 and the high-specific resistance region 142 was fabricated similarly to the experimental example 2-1 (experimental example 3-1). Further, the base layer 143 was not formed and only the high-specific resistance region 142 was formed to have a film thickness of 200 nm with use of CoFeNi (experimental example 3-2). The examined results of the relationship between the magnetic permeability and the frequency in these experimental examples are illustrated in FIG. 22.

Figure 22:
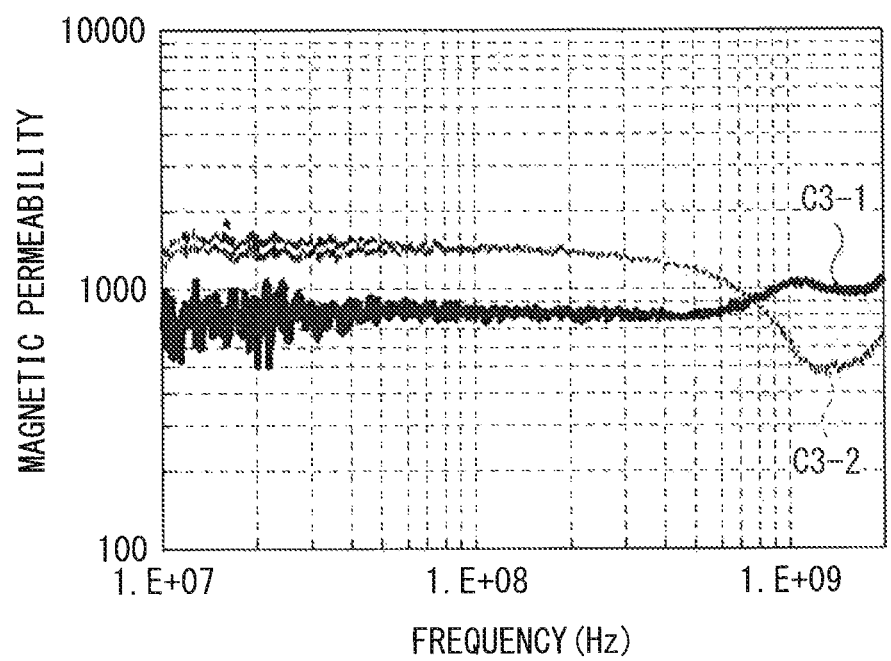
FIG. 22 is a characteristic diagram illustrating frequency characteristics of magnetic permeability in experimental examples 3-1 to 3-2.

As illustrated in FIG. 22, decline in magnetic permeability was observed in the high frequency region in the experimental example 3-2, whereas such decline in magnetic permeability in the high frequency region did not occur in the experimental example 3-1.

Experimental Examples 4-1 TO 4-3

The sample of the stacked-layer structure of the base layer 143 and the high-specific resistance region 142 was fabricated similarly to the experimental example 2-1 except that the base layer 143 was formed of Ru to have a film thickness of 2 nm (experimental example 4-1). In addition, the sample of the stacked-layer structure of the base layer 143 and the high-specific resistance region 142 was fabricated similarly to the experimental example 2-1 except that the base layer 143 was formed of CoFeNi to have a film thickness of 3 nm (experimental example 4-2). Further, the sample of only the high-specific resistance region 142 was fabricated to have a film thickness of 200 nm with use of a mixed material that is obtained by adding $ZrO_2$ to $Fe_{0.7}Co_{0.3}$ such that $ZrO_2$ accounts for 7 at % or lower of the total, without forming the base layer 143 (experimental example 4-3). The examined results of the relationship between the magnetic permeability and the frequency in these experimental examples are illustrated in FIG. 23, together with the results of the experimental example 2-1.

Figure 23:
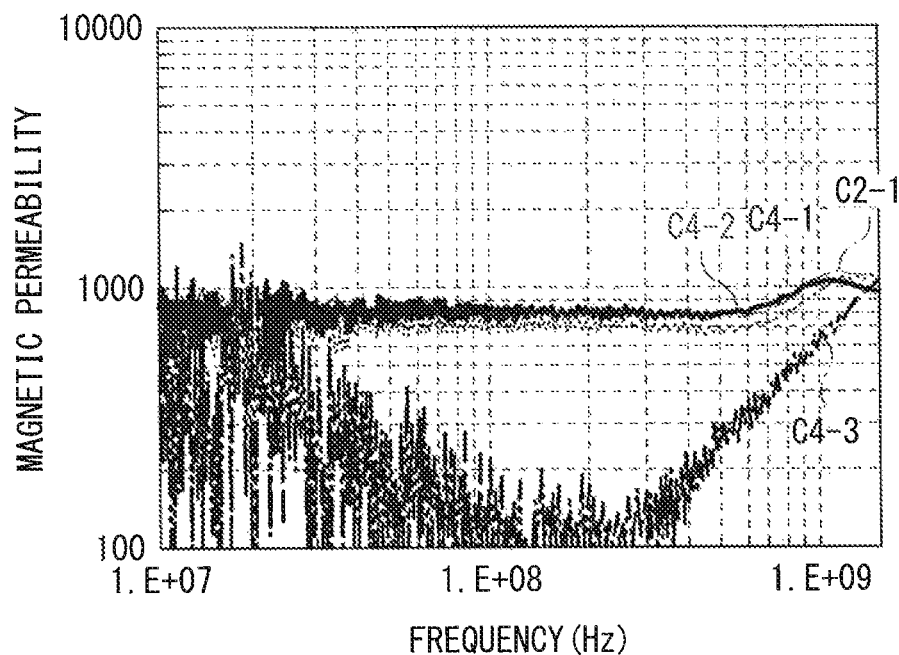
FIG. 23 is a characteristic diagram illustrating frequency characteristics of magnetic permeability in experimental examples 4-1 to 4-3.

As illustrated in FIG. 23, it was found from comparison of the experimental example 4-3 and the experimental examples 2-1, 4-1, and 4-2 that forming the base layer 143 makes it possible to obtain stable magnetic permeability over wider frequency region.

Experimental Examples 5-1 AND 5-2

Figure 24:
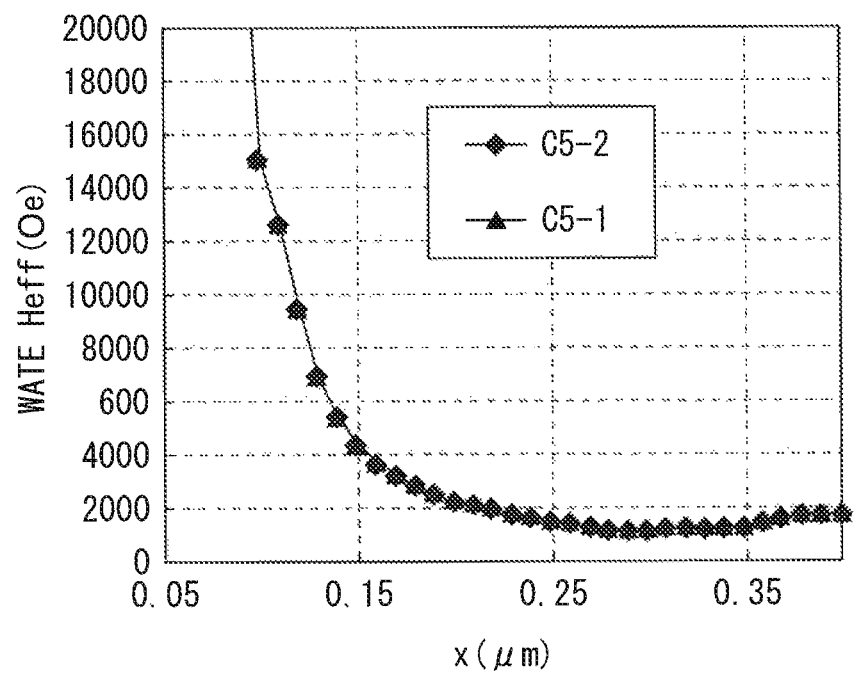
FIG. 24 is a characteristic diagram illustrating distribution of wide adjacent track erase (WATE) effective magnetic field in experimental examples 5-1 and 5-2.

Next, influence of the main magnetic pole 14 having the high-specific resistance region 142 to the WATE effective magnetic field was examined (experimental example 5-1). The result is illustrated in FIG. 24. Incidentally, here, the case where the main magnetic pole 14 is formed of only the low-specific resistance region 141 made of FeCo was used as reference (experimental example 5-2). Note that, in FIG. 24, the lateral axis indicates a distance (μm) from a center position in the cross track direction, and the vertical axis indicates the WATE effective magnetic field (Oe). The WATE effective magnetic field means effective magnetic field affecting adjacent tracks within a wide range (for example, two to ten tracks adjacent to a track to be written), out of the recording magnetic field emitted from the air bearing surface toward the magnetic recording medium.

As illustrated in FIG. 24, substantive difference relating to the WATE effective magnetic field between the experimental examples 5-1 and 5-2 was not observed.

Experimental Examples 6-1 TO 6-3

Next, influence of the main magnetic pole 14 having the high-specific resistance region 142 to the rising time was examined. The results are illustrated in Table 2. The rising time used herein indicates a time necessary for saturation of the magnetic field of the main magnetic pole 14, and more specifically, indicates a time from application of the magnetic field until reaching 80% of the saturation magnetic field. Here, comparison between a case where the main magnetic pole 14 was formed of only FeCo (experimental example 6-1), a case where the high-specific resistance region 142 was formed to have a film thickness of 200 nm with use of a mixed material that was obtained by adding $ZrO_2$ to $Fe_{0.7}Co_{0.3}$ such that $ZrO_2$ accounts for 1 at % or lower of the total (experimental example 6-2), and a case where the high-specific resistance region 142 was formed to have a film thickness of 200 nm with use of a mixed material that is obtained by adding $ZrO_2$ to $Fe_{0.7}Co_{0.3}$ such that $ZrO_2$ accounts for 5 at % or lower of the total (experimental example 6-3) was performed. Incidentally, the saturation magnetic flux density Bs of the high-specific resistance region 142 was 2.20 T in the experimental example 6-2 and 2.04 T in the experimental example 6-3. Moreover, the specific resistance of the high-specific resistance region 142 was 38 μΩ·cm in the experimental example 6-2 and 112

$\mu\Omega\cdot cm$ in the experimental example 6-3. Further, the saturation magnetic flux density Bs of FeCo was 2.4 T and the specific resistance of FeCo was 14.0 $\mu\Omega\cdot cm$.

TABLE 2

|  | High-Specific Resistance Region | Rising Time (ps) |
|---|---|---|
| Experimental Example 6-1 | None | 60.7 |
| Experimental Example 6-2 | $ZrO_2$ of 1 at % added | 58.2 |
| Experimental Example 6-3 | $ZrO_2$ of 5 at % added | 53.8 |

As illustrated in Table 2, the rising time was the longest in the experimental example 6-1, and was the shortest in the experimental example 6-3 added with larger amount of $ZrO_2$. Specifically, it was confirmed the tendency that the rising time is further decreased when the main magnetic pole 14 contains moderate amount of the high-specific resistance material and includes both of the high saturation magnetic flux density Bs and the high specific resistance.

[6. Function and Effects of Thin Film Magnetic Head and Magnetic Recording-reproducing Unit]

In the thin film magnetic head 212 and the magnetic recording-reproducing unit of the present embodiment, the main magnetic pole 14 includes the high-specific resistance region 142 that has the specific resistance higher than that of the low-specific resistance region 141 having the end surface exposed on the air bearing surface 220, at the position recessed from the air bearing surface 220. Therefore, the main magnetic pole 14 exhibits the high magnetic permeability even in the high frequency region exceeding, for example, 1 GHz and is allowed to suppress lowering of response speed due to eddy loss, while maintaining the high saturation magnetic flux density Bs (for example, >2.0 T) as a whole. Accordingly, the thin film magnetic head 212 and the magnetic recording-reproducing unit of the present embodiment are allowed to realize excellent response characteristics in the high frequency region while addressing higher density recording. Here, since the high-specific resistance region 142 is provided at the position recessed from the air bearing surface 220, it is possible to avoid increase in WATE effective magnetic field. When the high-specific resistance region 142 is exposed on the air bearing surface 220, the boundary between the low-specific resistance region 141 and the high-specific resistance region 142 that are formed of different materials from each other is formed in the vicinity of the air bearing surface 220. Therefore, the flow of the magnetic flux emitted from the air bearing surface 220 of the main magnetic pole 14 may be disturbed by the boundary, which may cause increase of the WATE effective magnetic field. Further, since the high-specific resistance region 142 is provided at the position recessed from the air bearing surface 220, excellent flatness of the air bearing surface 220 is easily ensured. In a case where the high-specific resistance region 142 is exposed on the air bearing surface 220, at the time of forming the air bearing surface by polishing processing, the high-specific resistance region 142 projects more than the low-specific resistance region 141, and thus the flatness is difficult to be obtained. This is because the high-specific resistance material such as $ZrO_2$ has hardness higher than that of the magnetic material such as FeCo configuring the low-specific resistance region 141.

In particular, when the base layer 143 is provided and the high-specific resistance region 142 is formed on the base layer 143, the main magnetic pole 14 is allowed to obtain high magnetic permeability stably over a wider frequency region.

Moreover, the high-specific resistance region 142 is formed of the mixed material that is obtained by mixing the high-specific resistance material such as $ZrO_2$ with FeCo and the high-specific resistance material accounts for 7 at % or lower of the mixed material, and therefore, the specific resistance of the high-specific resistance region 142 is allowed to be 38 $\mu\Omega\cdot cm$ or larger even in the high frequency region (>1 GHz) while the high saturation magnetic flux density Bs exceeding 2.0 T is maintained.

[7. Modifications]

Hereinbefore, although the invention has been described with reference to the embodiment, the invention is not limited to the above-described embodiment, and various modifications may be made. For example, although the perpendicular magnetic write head of the invention is applied to the composite head, it is not necessarily limited thereto, and the perpendicular magnetic write head may be applied to a write-only head without a read head section.

Figure 25:
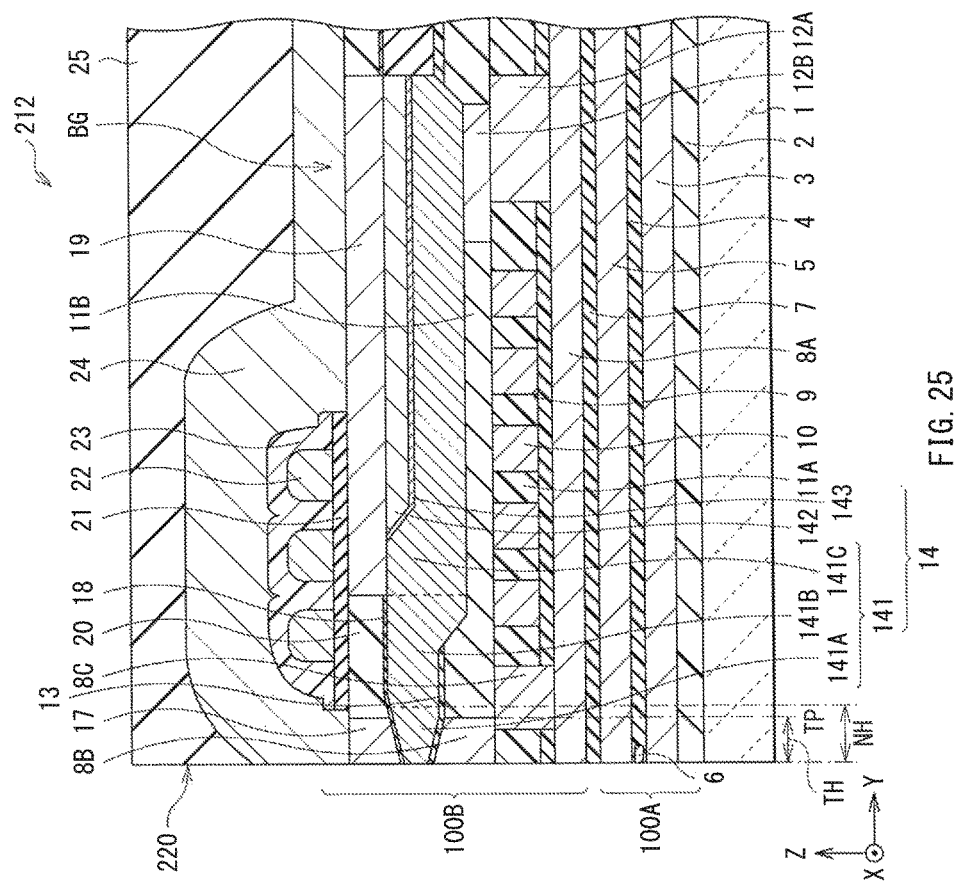
FIG. 25 is a sectional diagram illustrating a modification relating to the structure of the thin film magnetic head.

Moreover, the structure (shape) of the main part of the thin film magnetic head is allowed to be variously modified. In the above-described embodiment, the high-specific resistance region 142 is formed as a lower layer of the low-specific resistance region 141; however, for example, as illustrated in FIG. 25, the high-specific resistance region 142 may be formed as an upper layer of the low-specific resistance region 141. In such a case, the base layer 143 may be further provided between the high-specific resistance region 142 and the low-specific resistance region 141. In this case, the base layer 143 may be preferably formed of, for example, NiFe or CoFeNi. In addition, the thickness of the low-specific resistance region 141 may be preferably larger than the thickness of the high-specific resistance region 142, the low-specific resistance region 141 may be preferably formed by plating, and the high-specific resistance region 142 may be preferably formed by sputtering.

Incidentally, the high-specific resistance region 142 is not limited to the case of being arranged at the position illustrated in FIG. 3B and FIG. 25, and is arranged at an arbitrary position as long as the high-specific resistance region 142 is not exposed on the air bearing surface 220.

The correspondence relationship between the reference numerals and the components of the present embodiment are collectively described as follows.

1 . . . substrate, 2, 9, 11A, 11B, 13, 20, 21, 23 . . . insulating layer, 3 . . . lower lead shield, 4 . . . shield gap, 5 . . . upper lead shield, 6 . . . magneto-resistive effect (MR) element, 7 . . . separation layer, 8A . . . magnetic layer, 8B . . . leading shield, 8C . . . recess shield, 10, 22 . . . thin film coil, 12A, 12B . . . coupling part, 14 . . . main magnetic pole, 141 . . . low-specific resistance region, 142 . . . high-specific resistance region, 143 . . . base layer, 141A . . . front end section, 141B . . . mid-section, 141C . . . rear end section, 16A, 16B . . . side shield, 17 . . . pedestal yoke, 18 . . . trailing gap, 19 . . . top yoke, 24 . . . write shield, 25 . . . overcoat, 220 . . . air bearing surface, 100A . . . read head section, 100B . . . write head section, 200 . . . housing, 201 . . . magnetic disk, 202 . . . magnetic head slider, 203 . . . suspension, 204 . . . arm, 205 . . . spindle motor, 206 . . . drive section, 207 . . . fixed shaft, 208 . . . bearing, 211 . . . base material, 212 . . . thin film magnetic head, 220 . . . air bearing surface.

What is claimed is:

1. A perpendicular magnetic recording head comprising:
a magnetic pole including a first region and a second region, the first region having a first specific resistance and an end surface exposed on an air bearing surface, the second region having a second specific resistance higher than the first specific resistance and being located at a position recessed from the air bearing surface,
wherein the first region is formed of FeCo, and the second region is formed of a mixed material that is obtained by mixing a high-specific resistance material containing one or more of $ZrO_2$, $SiO_2$, $Al_2O_3$, and MgO, with FeCo, and
the high-specific resistance material accounts for 7 at % or lower of the mixed material.

2. The perpendicular magnetic recording head according to claim 1, wherein the second specific resistance is 38 μΩ·cm or larger.

3. The perpendicular magnetic recording head according to claim 1, wherein the first region has a thickness larger than a thickness of the second region.

4. The perpendicular magnetic recording head according to claim 3, wherein
the first region is formed by plating, and
the second region is formed by sputtering.

5. A head gimbal assembly comprising:
a magnetic head slider having a side surface, the side surface including the perpendicular magnetic recording head according to claim 1; and
a suspension having an end, the end being attached with the magnetic head slider.

6. A head arm assembly comprising:
a magnetic head slider having a side surface, the side surface including the perpendicular magnetic recording head according to claim 1;
a suspension having a first end and a second end, the first end being attached with the magnetic head slider; and
an arm supporting the suspension at the second end thereof.

7. A magnetic disk unit provided with a magnetic recording medium and a head arm assembly, the head arm assembly comprising:
a magnetic head slider having a side surface, the side surface including the perpendicular magnetic recording head according to claim 1;
a suspension having a first end and a second end, the first end being attached with the magnetic head slider; and
an arm supporting the suspension at the second end thereof.

8. A perpendicular magnetic recording head comprising:
a magnetic pole including a first region and a second region, the first region having a first specific resistance and an end surface exposed on an air bearing surface, the second region having a second specific resistance higher than the first specific resistance and being located at a position recessed from the air bearing surface;
a leading shield including an end surface exposed on the air bearing surface; and
an insulating layer provided on an opposite side of the leading shield to the end surface, wherein
the second region is located between the insulating layer and the first region and is in contact with the first region.

9. The perpendicular magnetic recording head according to claim 8, further comprising
a first base layer between the second region and the insulating layer.

10. The perpendicular magnetic recording head according to claim 9, wherein the first base layer is formed of one of Ru (ruthenium), NiFe, and CoFeNi.

11. The perpendicular magnetic recording head according to claim 9, wherein the first base layer is formed of a material having a face-centered cubic (fcc) structure.

12. The perpendicular magnetic recording head according to claim 8, wherein the first region is formed of FeCo, and the second region is formed of a mixed material that is obtained by mixing a high-specific resistance material containing one or more of $ZrO_2$, $SiO_2$, $Al_2O_3$, and MgO, with FeCo.

13. The perpendicular magnetic recording head according to claim 8, wherein the second specific resistance is 38 μΩ·cm or larger.

14. A perpendicular magnetic recording head comprising:
a magnetic pole including a first region and a second region, the first region having a first specific resistance and an end surface exposed on an air bearing surface, the second region having a second specific resistance higher than the first specific resistance and being located at a position recessed from the air bearing surface;
a trailing shield including an end surface exposed on the air bearing surface; and
a yoke provided on an opposite side of the trailing shield to the end surface, wherein
the second region is located between the yoke and the first region.

15. The perpendicular magnetic recording head according to claim 14, further comprising
a second base layer between the second region and the first region.

16. The perpendicular magnetic recording head according to claim 15, wherein the second base layer is formed of one of NiFe and CoFeNi.

17. The perpendicular magnetic recording head according to claim 15, wherein the second base layer is formed of a material having a face-centered cubic (fcc) structure.

18. The perpendicular magnetic recording head according to claim 14, wherein the first region is formed of FeCo, and the second region is formed of a mixed material that is obtained by mixing a high-specific resistance material containing one or more of $ZrO_2$, $SiO_2$, $Al_2O_3$, and MgO, with FeCo.

19. The perpendicular magnetic recording head according to claim 14, wherein the second specific resistance is 38 μΩ·cm or larger.

* * * * *